(No Model.) 2 Sheets—Sheet 1.
W. H. SADLER.
METHOD OF AND APPARATUS FOR TEACHING BUSINESS PRACTICE.
No. 534,723. Patented Feb. 26, 1895.
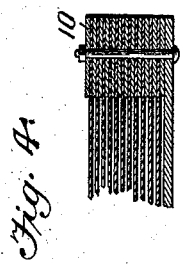
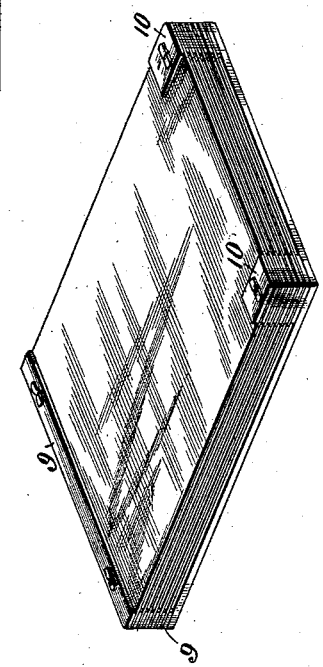
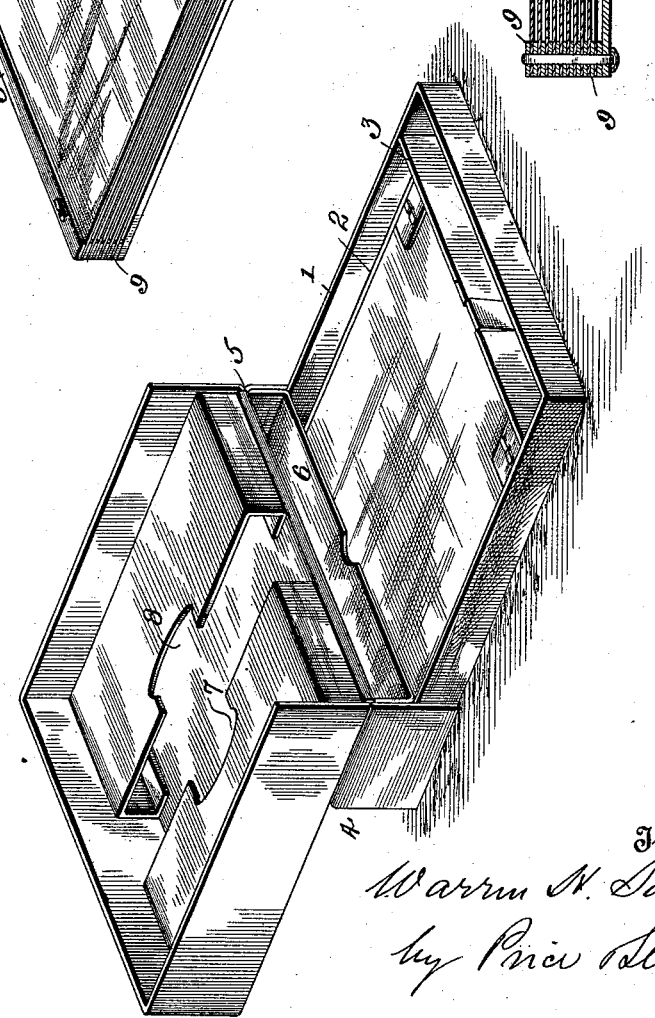
Witnesses
Inventor
Warren H. Sadler
by Price Stuart
Attorneys (No Model.) 2 Sheets—Sheet 2.
W. H. SADLER.
METHOD OF AND APPARATUS FOR TEACHING BUSINESS PRACTICE.
No. 534,723. Patented Feb. 26, 1895.
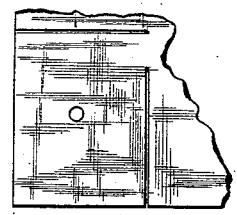
Fig. 11.
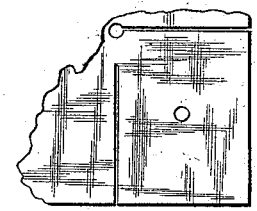
Fig. 12.
Fig. 5.
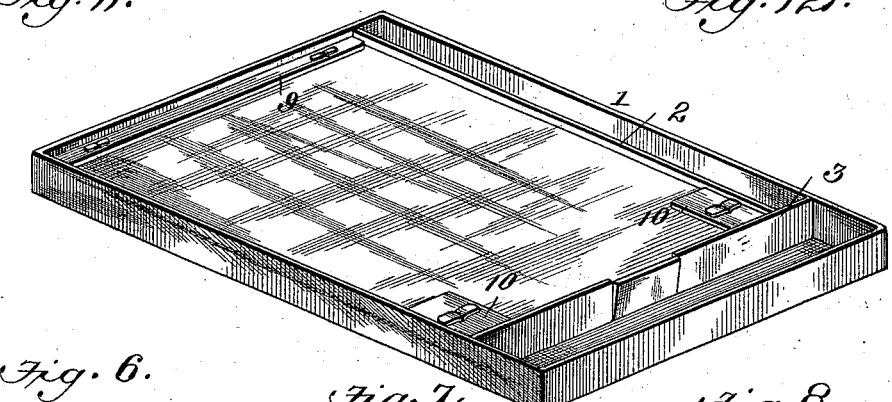
Fig. 6. Fig. 7. Fig. 8.
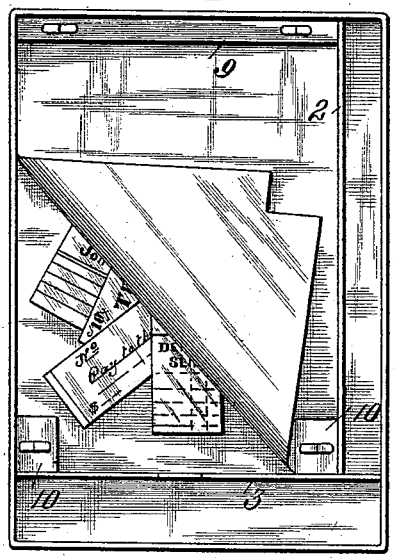
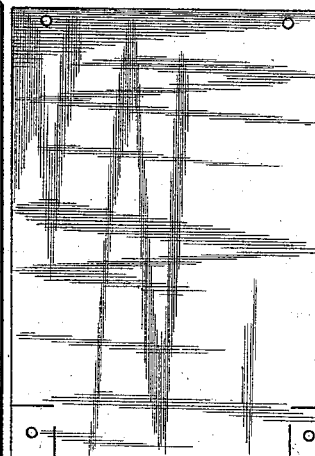
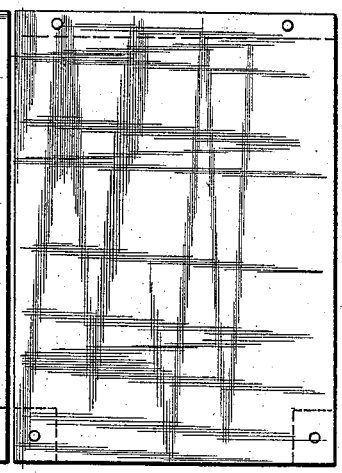
Fig. 9.
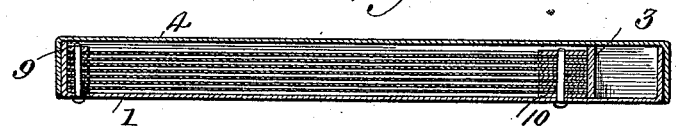
Fig. 10.
Witnesses
Inventor
Warren H. Sadler
by Price Stewart
Attorneys.

UNITED STATES PATENT OFFICE.

WARREN H. SADLER, OF BALTIMORE, MARYLAND.

METHOD OF AND APPARATUS FOR TEACHING BUSINESS PRACTICE.

SPECIFICATION forming part of Letters Patent No. 534,723, dated February 26, 1895.

Application filed October 29, 1894. Serial No. 527,198. (No model.)

*To all whom it may concern:*

Be it known that I, WARREN H. SADLER, a citizen of the United States, and a resident of Baltimore city, in the State of Maryland, have invented certain new and useful Apparatus for Teaching Business Practice, of which the following is a specification.

My invention consists of an apparatus for teaching bookkeeping and accounting and the drawing of forms of business papers by practical methods similar to such as are in use in daily practice in counting-houses.

The object of my invention is, to prepare an apparatus which may be put into the hands of a student and employed by him for the purpose of carrying out all of the practical business operations and book-keeping entries, which are daily performed in regular business offices, and my design is to provide an apparatus which can be so arranged with letters, bills, drafts, checks, notes, representative money, merchandise, and other business papers in such a manner that as each leaf is turned all of the necessary papers and instructions to make the desired business example will be presented to the student, and he will have the opportunity of answering the letters, making out, receiving, and paying the bills, making the bank deposits, drawing, issuing, and receiving checks, notes, drafts, and other business papers called for by the entries and exhibits which have been prearranged in the device so that the interleaved matter cannot be removed or examined until the sheet above it is torn off, the object of this arrangement being to prevent the student from seeing or examining more than the papers which are interlaid below the particular page torn off. Great advantage results from confining the student's attention to one problem at a time, and preventing his examining or passing to a second problem until the first one has been completed and thoroughly mastered.

The apparatus employed for this purpose consists of a box or case or cabinet, containing a pad or book having a number of sheets or leaves secured together in such a manner that a number of independent papers, such as letters, checks, drafts, necessary instructions, &c., may be arranged between each pair of leaves and held in place by the attachment of the leaves of the pad or book to one another, so that when each leaf is raised or torn off a set of prearranged examples and instructions will be exposed for the consideration of the student.

In the drawings Figure 1 represents the whole device, consisting of a box and pad contained therein, the cover of the box being thrown open. Fig. 2 is a perspective view of pad removed from box. Fig. 3 is a longitudinal section of the pad through one of its lower corners. Fig. 4 is a detail of the modified form of securing sheets of the pad together, consisting of a bolt to pass through the pad and provided with a nut on the upper end. Fig. 5 is a perspective view of the lower portion of the box containing the pad, the cover being omitted. Fig. 6 is a plan view of the box, showing Fig. 5 with the top sheet of the pad partially turned over and exposing to view the papers below. Fig. 7 is a plan view of one sheet of the pad as prepared for use, showing perforations for fastening the sheets together and slits in the corners to enable the sheets to be torn away from the fastening device at the lower end. In this figure the sheets are shown unperforated or cut at the end, and it is designed with this form of sheet to employ the pad as a book. Fig. 8 shows a modified form of pad having a series of slits or perforations across the pad and around the lower corners. Fig. 9 is a longitudinal section of a form of box and pad, such as is shown in Fig. 5, with a cover fitting closely over the same. Fig. 10 is a transverse vertical section of the same taken through the lower corners. Figs. 11 and 12 are forms of cutting or slitting of the sheets at their lower corners, so as to adapt them to be torn from the fastening device.

Referring to Fig. 1, 1 is a box consisting of a bottom portion containing vertical sides divided by partitions 2 and 3, so as to leave a space at the lower end of the box and one on the side, to be used for any desired purpose. In this box is located the pad, similar to that shown in Fig. 2, and which will be hereinafter described.

4 is the cover of the box. It consists of a casing of the same size as the box and adapted to fit over it, but having sides about twice the height of the sides of the box. This double height is employed for the purpose of providing pigeon holes or receptacles for papers. The box-lid is hinged at 5, so as to fold back.

6 is a pigeon hole or receptacle, formed in the stationary portion of the cover 4 and adapted to receive papers.

7 and 8 are pigeon holes or receptacles arranged on the inside of the movable portion of the cover parallel to its lid and having a space in the center, and adapted to receive papers.

Referring to Fig. 2, the pad therein shown is made in the usual manner by placing a number of sheets of paper upon one another, and securing the same together in any suitable manner. In consequence of the employment of the number of loose papers and also instructions, which are to be placed between or upon each of the sheets of the pad, it is desirable that filling strips or portions should be employed between the sheets of the pad at the point where they are united together. These filling strips or portions are shown in Fig. 2, as strips 9 and pieces 10. The strips 9—9 and pieces 10 are preferably formed of narrow pieces of thick paper, interlaid between the sheets of the pad and secured with the sheets of the pad together. In this figure they are shown at the top and two lower corners of the pad. It will be readily seen, however, that any other desired arrangement of strips or filling pieces and sheets of the pad may be employed, so long as the leaves of the pad cannot be raised and the interlaid matter examined until the page above has been torn off.

In Fig. 2 the pad is shown constructed by superimposing upon one another series of strips 9—9 and filling strips 10—10 and the sheets of the pad, and then securing the whole together by passing a paper fastener through the whole. The same result may be accomplished by employing a bolt such as is shown in Fig. 4, or a wire or staple such as are used in fastening papers, books, &c. These strips or filling pieces may be made to surround the pad entirely, or they may be located only at the four corners or any other desired place, or in any other manner.

Fig. 7 shows a method of cutting the sheets of the pad so that they may be severed from the filling strips and holding devices at two of their corners, while remaining held on the opposite side, thus forming a bound book.

Fig. 8 shows a sheet perforated in a straight line across one side and around the corners at the opposite side, adapting the sheet to be raised at the side between the perforated corners, severing the corners and then tearing the sheet from the opposite side.

Figs. 11 and 12 show two forms of cutting the sheets at the corners to permit severance.

Fig. 6 shows the pad in the box with the top sheet severed from one corner and turned over preparatory to severing the other corner and tearing it from the top edge, exposing loose papers which are located below the sheet.

Figs. 9 and 10 are vertical sections of the pad in its box, as shown in Fig. 5, with a cover fitting closely over it and not using the cover having pigeon holes, such as shown in Fig. 1.

Referring to Figs. 1 and 5, the partition 3 is cut in its center, either with a notch extending the whole depth of the partition, or with slits which permit a portion of the partition to be folded down, thus permitting access to the edge of the sheets of the pad. It is my design to vary this construction in several ways, while retaining the principle of the invention. The construction may be varied by omitting the filling strips entirely and printing on the sheets of the pad themselves all of the examples desired, so that the tearing of each sheet will expose a succeeding sheet bearing the desired example for the student. The perforation of the sheet adapting it to be severed from its connecting device may be of various characters or forms. The connecting devices may be of any desired character, the pages may be glued together at their edge, as is usual in the forming of pads, or they may be held together by the fastening devices shown in the drawings, or such other device as may be desired.

It is designed when preparing the pages to place between each sheet of the pad a series of prepared examples, so arranged that all of the incoming mail and papers will be in the exact form of the papers received by a business house in regular business, with or without blanks to be filled up for all of the necessary incoming or outgoing papers. These examples are to be arranged in such a manner and with such knowledge of the bookkeeping entries which are to be made in consequence that the teacher will be able to tell whether the student's work based upon these examples is correct or not. The instructions for the guidance of the student may be printed upon the leaves of the pad, or on separate sheets which may be interleaved with the exhibits.

The box shown in Fig. 3 is adapted to hold pens, pencils, and the cover to receive notes, checks, bills, &c. The form and shape of the box may be altered as practice may require.

Having thus described my invention, what I desire to claim is—

1. In an apparatus for teaching business practice, the combination of a series of sheets or pages suitably secured together to retain independent papers interleaved between them, so that the interleaved matter cannot be removed or examined until the sheet above it is torn off with a series of independent business papers such as checks, bills, letters, &c. interleaved between the pages, substantially as described.

2. In an apparatus for teaching business practice, the combination of a series of sheets of paper secured together in any suitable manner at their edges or portions thereof, so that the interleaved matter cannot be removed or examined until the sheet above it is torn off and perforated or slitted around the points at which they are secured together so as to adapt each sheet to be torn from the pad, with a number of independent examples of business transactions such as checks, bills &c. interlaid loosely between the pages but retained between the sheets, substantially as described.

3. In an apparatus for teaching business practice the combination of a series of sheets of paper secured together in any suitable manner, so that the interleaved matter cannot be removed or examined until the sheet above is torn off and having printed upon them a problem or instructions for the guidance of a student in the use of a series of business papers, with a series of independent business papers such as checks, bills, &c. interlaid between the sheets and retained in place by the means of securing the sheets together, so that when the instruction sheet is torn off the independent papers constituting the materials for the problem will be exposed.

4. In an apparatus for teaching business practice the combination of a series of sheets of paper secured together at the top and bottom and having printed upon them a problem or instructions for the guidance of a student in the use of a series of business papers, with a series independent business papers such as checks, bills &c. interlaid between the sheets and retained in place by the means of securing the sheets together, so that when the instruction sheet is torn off the independent papers constituting the materials for the problem will be exposed.

Signed at Baltimore city, in the State of Maryland, this 23d day of October, A. D. 1894.

WARREN H. SADLER.

Witnesses:
HARRY CARROLL,
CHARLES L. BUCK.